Figure 12:
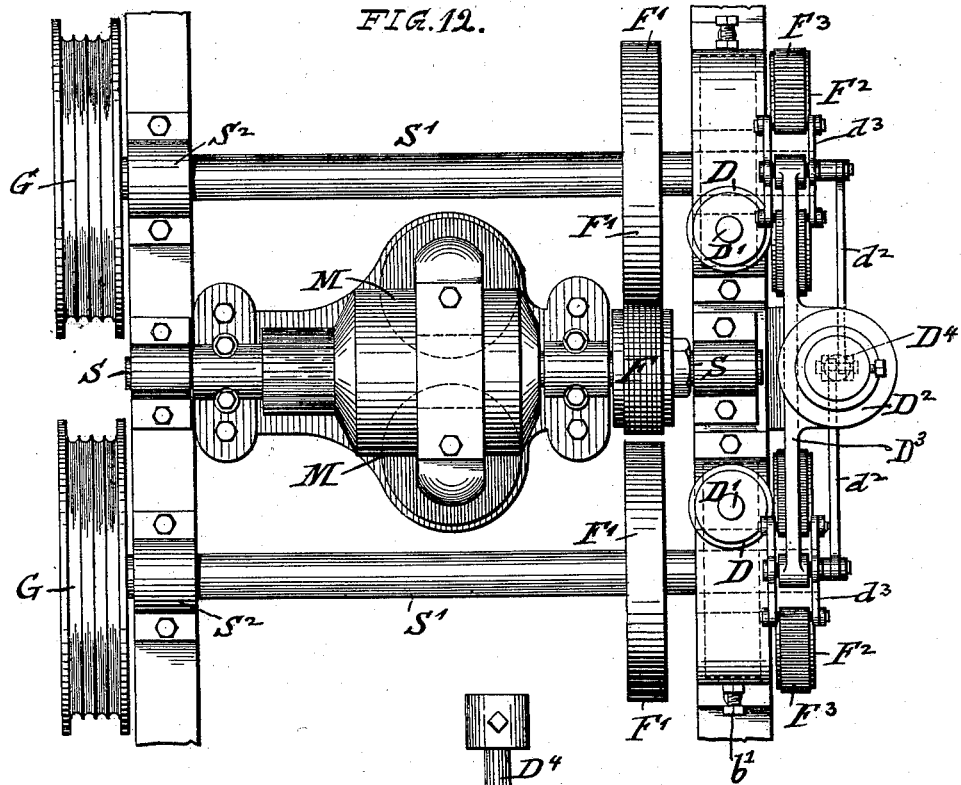

No. 646,918. Patented Apr. 3, 1900.
G. H. REYNOLDS.
ELEVATOR.
(Application filed Jan. 27, 1900.)
(No Model.) 5 Sheets—Sheet 1.
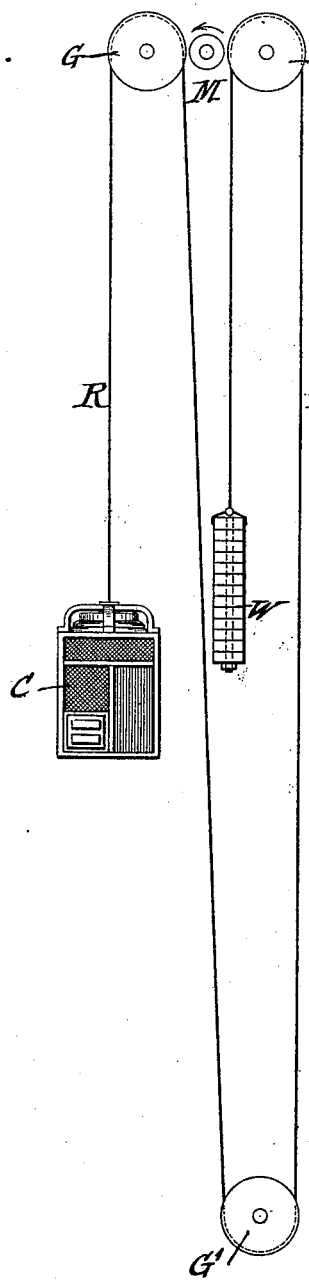
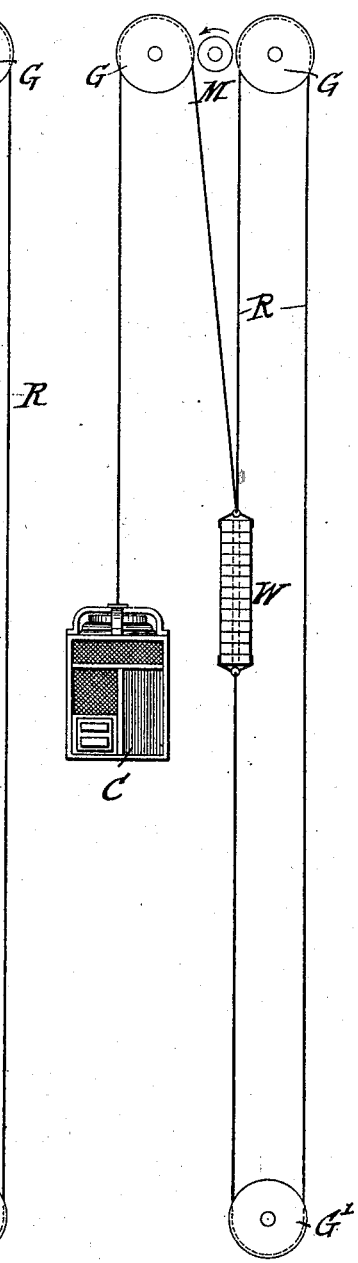
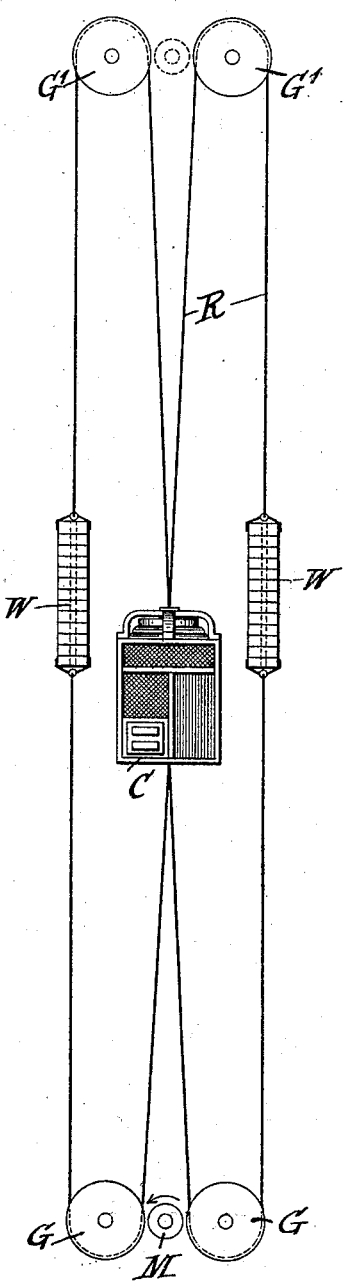
WITNESSES:
INVENTOR
Geo. H. Reynolds.
BY
ATTORNEYS No. 646,918. Patented Apr. 3, 1900.
G. H. REYNOLDS.
ELEVATOR.
(Application filed Jan. 27, 1900.)
(No Model.) 5 Sheets—Sheet 2.
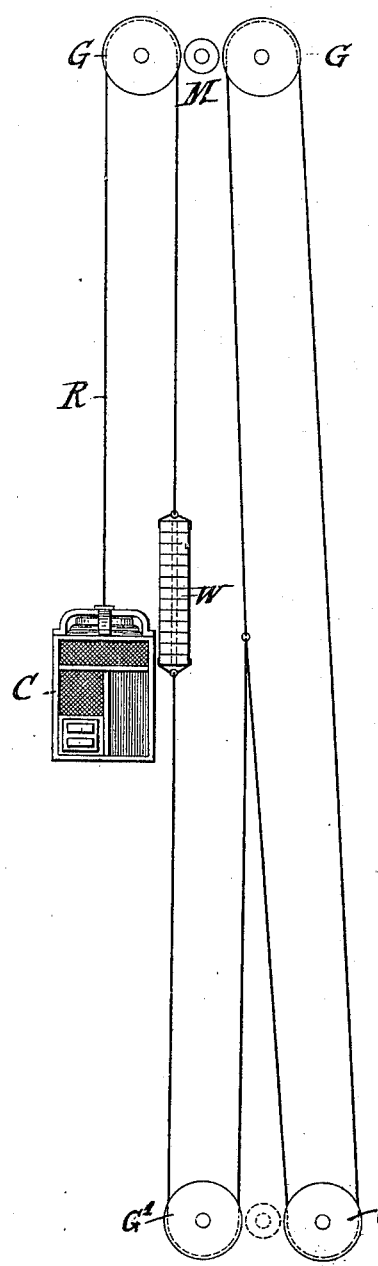
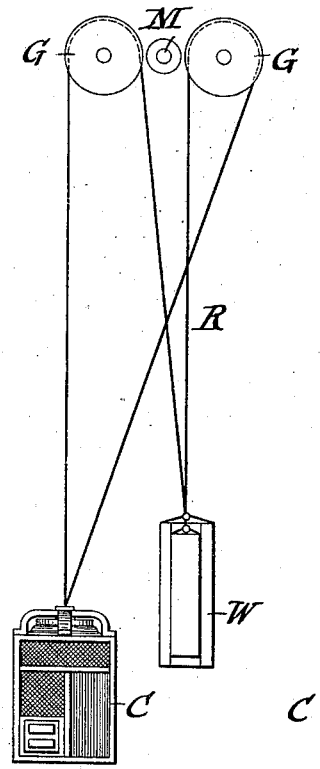
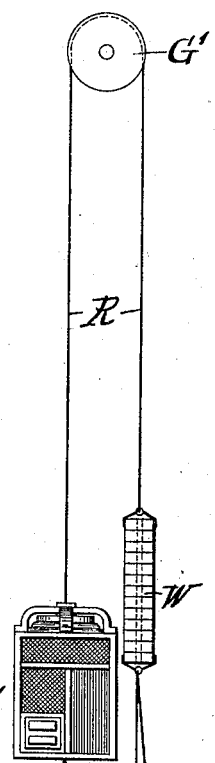
FIG. 4. FIG. 5. FIG. 6.
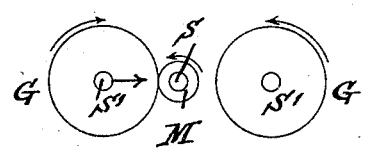
FIG. 10.
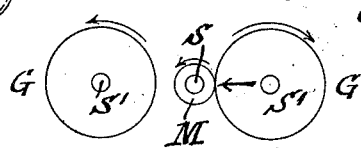
FIG. 11.
WITNESSES:
Bruno von Beitzingsloven
Joseph H. Niles.
INVENTOR
Geo. H. Reynolds.
BY
ATTORNEYS

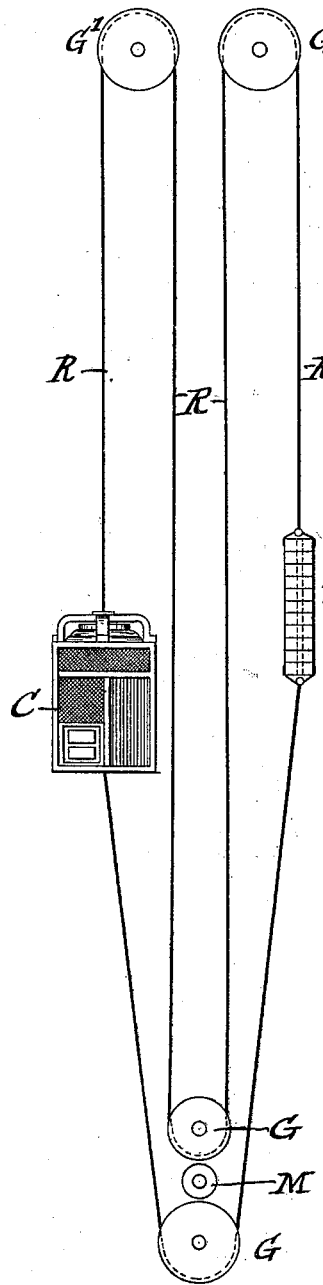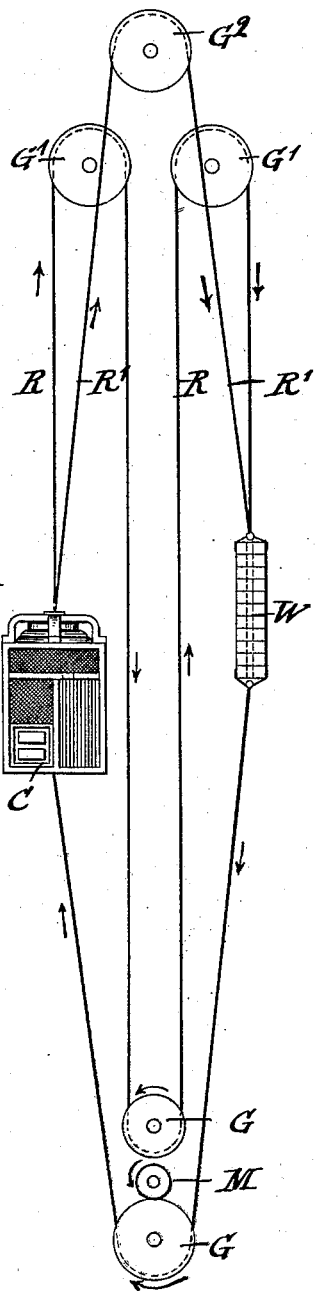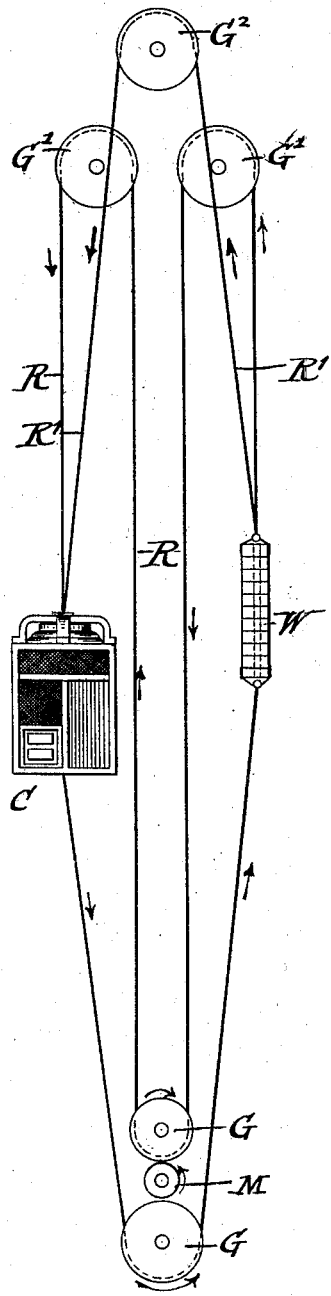

No. 646,918. Patented Apr. 3, 1900.
G. H. REYNOLDS.
ELEVATOR.
(Application filed Jan. 27, 1900.)
(No Model.) 5 Sheets—Sheet 4.

WITNESSES:
Bruno von Biltzingslöwen
Joseph H. Niles.

INVENTOR
Geo. H. Reynolds.
BY
ATTORNEYS

No. 646,918. Patented Apr. 3, 1900.
G. H. REYNOLDS.
ELEVATOR.
(Application filed Jan. 27, 1900.)
(No Model.) 5 Sheets—Sheet 5.
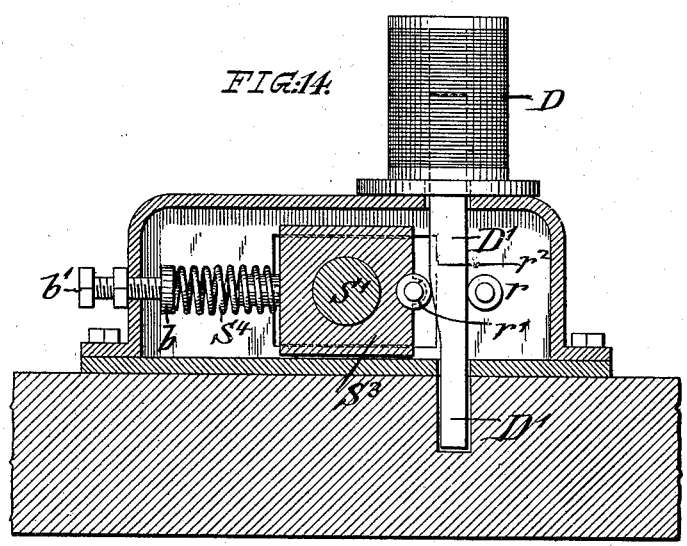
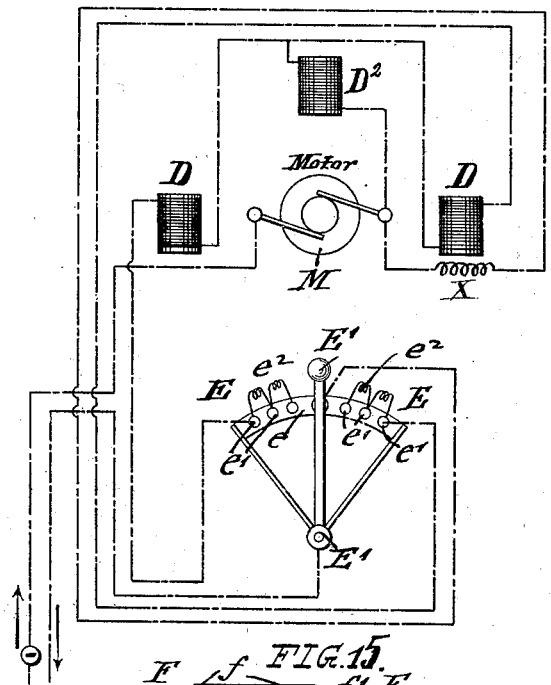
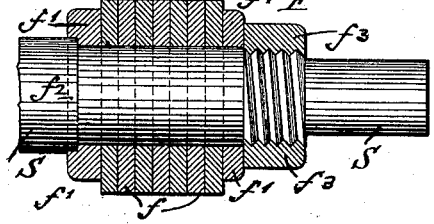
WITNESSES: INVENTOR
Geo. H. Reynolds,
BY
ATTORNEYS

UNITED STATES PATENT OFFICE.

GEORGE H. REYNOLDS, OF NEW YORK, N. Y., ASSIGNOR TO THE OTIS ELEVATOR COMPANY, OF SAME PLACE.

ELEVATOR.

SPECIFICATION forming part of Letters Patent No. 646,918, dated April 3, 1900.

Application filed January 27, 1900. Serial No. 2,989. (No model.)

*To all whom it may concern:*

Be it known that I, GEORGE H. REYNOLDS, a citizen of the United States, residing in the city of New York, in the borough of Manhattan and State of New York, have invented certain new and useful Improvements in Elevators, of which the following is a specification.

This invention relates to an improved elevator in which the power to move the car in one or the opposite direction is transmitted from a motor running continuously in one direction by suitable intermediate mechanisms to the suspension-ropes of the car and its counterweight; and the invention consists in the combination, with a car and its counterweight, of a suspension-rope for the same, drive-sheaves for said rope, a motor running continuously in one and the same direction, and intermediate motion-transmitting mechanisms between said motor and drive-sheaves, each of said mechanisms being adapted to be thrown into operative connection with the motor.

The invention consists, further, of an elevator in which a motor running continuously in one and the same direction transmits its power by an intermediate friction mechanism to separate drive-sheaves, ropes passing over said drive-sheaves, a car and its counterweight suspended from said ropes, and means for actuating said friction mechanism at will, so that the motor transmits motion directly to one drive-sheave in one direction and to the other drive-sheave in the opposite direction.

The invention consists, further, of brake mechanism operated in connection with the friction mechanism by which the motion is transmitted from the motor to the sheaves and ropes controlling the motion of the car and its counterweight; and the invention consists, lastly, of certain additional details of construction and combinations of parts which will be more fully described hereinafter and finally pointed out in the claims.

Figure 13:
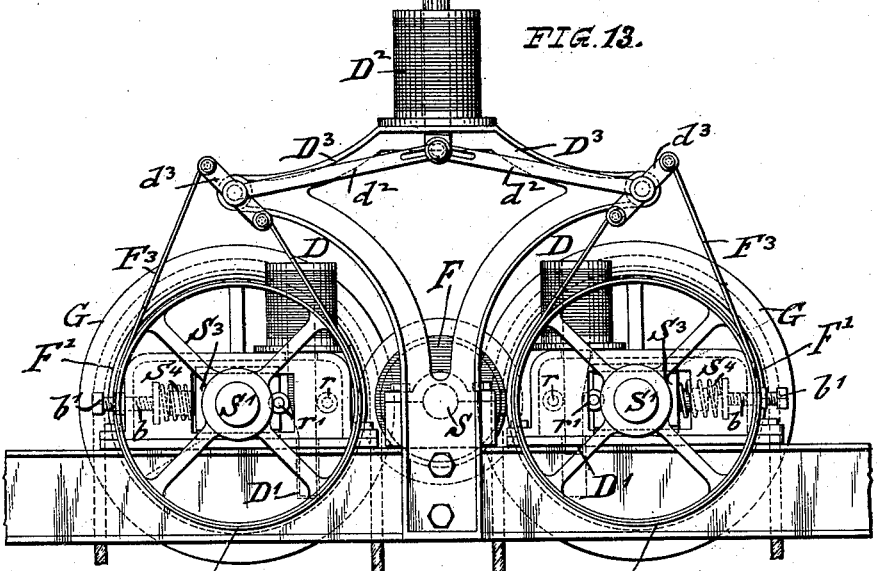

In the accompanying drawings, Figures 1 to 9 are diagrams showing the different arrangements of the suspension-ropes of my improved elevator, Figs. 1, 2, 4, and 5 showing the power-transmitting motor arranged at the upper end of the elevator-shaft, while Figs. 3, 6, 7, 8, and 9 show the motor arranged at the lower end of the elevator-shaft, and Figs. 8 and 9 also in addition thereto show a safety-rope for the car. Figs. 10 and 11 are diagrams showing the driving-gear of the elevator. Fig. 12 is a plan view of the motor, the mechanism for transmitting motion from the same to the drive-sheaves, and the brake mechanism for the motion-transmitting mechanism. Fig. 13 is a side elevation of Fig. 12. Fig. 14 is a detail vertical section of an electrically-controlled device for operating one of the motion-transmitting friction mechanisms. Fig. 15 is a detail vertical longitudinal section of a friction-wheel on the motor-shaft which may be employed in my improved motion-transmitting friction mechanism, and Fig. 16 is a diagram showing the electrical connections and circuits employed in case the elevator is operated by electric power.

Similar letters of reference indicate corresponding parts.

In my improved system for passenger or freight elevators any motor may be used for imparting motion to the car or platform, said motor being arranged either at the upper or lower end of the elevator-shaft. The motor M is run continuously in one and the same direction and may be driven either by steam, water, or electricity, or other power, an electric motor being used by preference when the same is to be located at the upper end of the elevator-shaft, while when a steam or hydraulically driven motor is used it is preferably located at the lower end of the elevator-shaft. The continuous motion of the motor in one direction is transmitted by suitable motion-transmitting mechanism to the suspension-ropes of the car C, said ropes passing over suitable drive and guide sheaves located at the upper and lower ends of the elevator-shaft or at the upper end alone. The car C is suspended from one of the runs of the ropes, while the counterbalancing-weight W is suspended from a second run of the ropes. The ropes and their sheaves may be arranged in any one of the forms shown in the different diagrams, Figs. 1 to 9, either by arranging the motor and two drive-sheaves at the upper end and a guide-sheave at the lower end of the elevator-shaft, as shown in Figs. 1 and 2, or by arranging two guide-sheaves at the upper end and the motor and two drive-sheaves at the lower end, as shown in Figs. 3, 7, 8, and 9, or by arranging two drive-sheaves at the upper and two guide-sheaves at the lower end, as shown in Fig. 4, or by arranging two drive-sheaves at the upper end of the elevator-shaft and no guide-sheaves at the lower end, as shown in Fig. 5, or by arranging one guide-sheave at the upper end and the motor and two drive-sheaves at the lower end, as shown in Fig. 6. Any other suitable operative connection of the motion-transmitting mechanisms of the motor with the ropes of the car and counterbalancing-weight may, however, be made, as the different figures referred to show only a number of the possible applications.

In Fig. 1 the car is suspended from a suspension-rope, which is guided first over a top drive-sheave, then over a lower guide-sheave, and then over a second top drive-sheave, the counterweight being suspended from the opposite end of the rope.

In Fig. 2 the car is suspended from a rope which passes over a drive-sheave at the upper end of the elevator-shaft to the counterweight, while a second rope passes over the second drive-sheave and a guide-sheave, one at the upper and the other at the lower end of the shaft, and is connected, respectively, to the upper and lower ends of the counterweight.

In Fig. 3 the car is connected at its upper and lower ends to two ropes, each of which is conducted over a guide and drive sheave, respectively, at the upper and lower ends of the shaft, two counterweights being used in this case, one for each rope.

In Fig. 4 the car is suspended from a rope which passes over a drive-sheave at the upper end of the shaft to the counterweight, the lower end of the counterweight being connected with a second rope, which passes over a guide-sheave at the lower part of the shaft, and with a rope which passes over a drive and guide sheave.

In Fig. 5 the car is suspended from two ropes, one rope passing over a drive-sheave at the top of the shaft to a counterweight, while the second rope passes from the top of the car over a second drive-sheave at the upper part of the shaft to a second counterweight, which guides the first counterweight.

In Fig. 6 the car is suspended from a rope which passes over a guide-sheave at the upper part of the shaft to the counterweight, the lower end of the counterweight being connected by a second rope and a drive-sheave with the lower part of the car, while a third rope passes over a second drive-sheave at the lower end of the shaft, also to the lower part of the car.

In Fig. 7 the car is suspended from a rope which passes over a guide-sheave at the upper part of the shaft, a drive-sheave at the lower part, and a second guide-sheave at the upper part of the shaft to the counterweight, while a second rope connects the car over a drive-sheave at the lower part of the shaft with the counterweight, the drive-sheaves being in this case arranged one above the other.

In Figs. 8 and 9 the car and counterweight are suspended in the same manner as in Fig. 7, only that in addition to the suspension-rope a third or safety rope is employed, which passes over an independent safety-sheave and connects the upper end of the car with the upper end of the counterweight.

The intermediate motion-transmitting mechanisms between the motor M and the drive-sheaves consist of a friction-wheel F on the motor-shaft S and two friction-wheels F' on two auxiliary shafts S'. The friction-wheel F is made of a number of disks $f$ of carefully-prepared rawhide, which are firmly held together by means of washers $f'$, that are retained between shoulder $f^2$ on the motor-shaft S and a screw-nut $f^3$, engaging a threaded portion of the shaft, as shown in Fig. 15. A friction-wheel F of the construction described is capable of resisting the wear to which it is subjected; but it is obvious that any other approved construction of friction-wheel may be employed. The auxiliary shafts S' are arranged parallel with the motor-shaft S and equidistantly therefrom and supported in suitable journal-bearings on the supporting-beams of the elevator. The journal-bearings $S^2$ at one end of the auxiliary shafts S' are so arranged that the shafts have a certain play in the same, while the journal-bearings $S^3$ near the opposite ends of the shafts S' are laterally movable by mechanism hereinafter described, so that one or the other of the friction-pulleys F' on the shafts S' can be moved into frictional contact with the driving-wheel F. The auxiliary shafts S' and their friction-wheels may be laterally shifted by any suitable mechanism controlled from the car, said mechanism being operated by any suitable power, as desired. In the drawings electrically-operated mechanisms are shown for shifting the auxiliary shafts S'. Each shifting mechanism consists of a solenoid D, one for each shaft, which is supported on a suitable casing which surrounds and guides the shiftable journal-bearing $S^3$ of the shaft S', as shown in Fig. 4, said solenoid controlling a core D', the lower end or shank of which is guided between suitable rollers $r\,r'$, of which the roller $r$ is placed on a short shaft on the casing, while the guide-roller $r'$ is supported on the laterally-shiftable journal-bearing. The lower end of the core D' of the solenoid D is provided at the side adjacent to the roller $r'$ with an incline $r^2$, so that when the core is raised or sucked in by the solenoid the laterally-shiftable journal-bearing $S^3$ is moved with the shaft S' by a strong spring $S^4$, which is interposed between it and a disk $b$ on an adjusting-screw $b'$ into mesh with the friction-wheel F. The adjusting-screw $b'$ serves to set the spring $S^4$ to the proper tension, so that the shiftable journal-bearing $S^3$ is quickly and reliably moved in lateral direction on the raising of the solenoid-core $D'$. A suitable circuit-controller E is arranged in the car, as shown in Fig. 16, said circuit-controller consisting of a hand-operated switch-lever $E'$, which passes over a number of contacts $e'$ on a segmental bar $e$, said contacts being connected with suitable resistances $e^2$, so as to permit the regulation of the speed of the motor and car. The electrical circuits and their connection with the car and solenoids are shown in Fig. 16. The motor is operated by the current supplied by any suitable source of electricity, so as to be run continuously in the same direction whether the car is at rest or moved in one or the opposite direction. The solenoids D are located near the auxiliary motion-transmitting shafts $S'$ and placed in circuit with the circuit-controller E. The switch-lever $E'$ is moved to one side when one shaft $S'$ is to be shifted and to the other side when the other shaft $S'$ is to be shifted. As soon as either one of the solenoids D is switched into circuit by the circuit-controller its core is immediately drawn in, so that its incline $r^2$ is moved above the guide-roller $r'$ on the journal-bearing of the auxiliary shaft $S'$, so that the lower narrower end of the core moves along the roller $r$ and permits thereby the instant lateral movement of the auxiliary shaft $S'$ under the influence of the spring $S^4$, so that the friction-wheel $F'$ is pressed into frictional contact with the transmitting friction-wheel F on the motor-shaft. At the opposite end of each auxiliary shaft $S'$ is arranged a drive-sheave G, over which sheaves the suspension-ropes R of the car and counterweight are conducted, one auxiliary shaft and sheave serving to transmit motion to the car in one direction and the other shaft and sheave serving to transmit motion to the car in the opposite direction. The drive-sheaves G are provided with a plurality of grooves, so as to permit the use of a plurality of cables, if desired. The drive-sheaves are located at the upper or lower end of the elevator-shaft, while the guide-sheaves for the ropes R are located at the opposite end of the same.

On each auxiliary shaft $S'$ is arranged, preferably adjacent to the friction-wheel $F'$, a brake-wheel $F^2$, which forms, with a suitable brake-band and a suitable actuating mechanism, an effective brake for holding the car when at rest. When electricity is employed as the source of power, it is preferable to arrange a solenoid $D^2$ of suitable strength between the solenoids $D'$ on a bracket-frame $D^3$, the core $D^4$ of the solenoid $D^2$ being connected at its lower end by pivot-links $d^2$ with fulcrumed levers $d^3$, the ends of which are connected with the ends of the brake-band $F^3$. The brake-actuating solenoid $D^2$ is located in a shunt of the main circuit, by which the current is supplied to the solenoids $D'$, which produce the shifting of one of the auxiliary shafts $S'$ at the time, so that the brakes are actuated whenever the car is stopped, but released as soon as the car is started. When the car is to be stopped, the lever of the circuit-controller is placed at the median position on the segment of the controller, so that the current, after passing through the motor and a resistance $x$ interposed between it and the switch, is returned to the source of electricity without exciting either one of the solenoids D, by which the auxiliary shafts $S'$ are operated, or the brake-controlling solenoid $D^2$. Consequently as no current passes through the solenoid $D^2$ the core of the same is free to drop and presses the pivot-links $d^2$, which are connected with the brake-levers $d^3$, in downward direction, so that the latter are turned on their fulcra and the brake-bands applied to the circumference of the brake-wheels, and hold thereby the car in position. When the car is to be started in one or the opposite direction, the switch-lever $E'$ is moved in the required direction, and thereby one of the solenoids D and the solenoid $D^2$ thrown in circuit, so that the motion is instantly imparted to the car and the brakes simultaneously released by the releasing of the brake-bands from the brake-wheels by the action of the solenoid $D^2$. The core of the solenoid $D^2$ is made heavy enough to produce the action of the brakes and the holding of the car in position when stopped. In place of the friction-brake shown any other approved brake may be employed, as I do not confine myself to the special construction shown.

The operation of my improved elevator is as follows: By moving the switch-lever $E'$ of the circuit-controller from the middle contact of the segment to an adjacent contact at one side of the middle contact the current, which has heretofore passed successively through the motor, resistance $x$, and lever $E'$, is caused to pass through the motor, solenoid $D^2$, one of the solenoids D, all of the resistance $e^2$ at that side of the segment toward which the lever has been moved, and through the lever $E'$. The brakes are thereby released and one of the friction-wheels $F^2$ thrown into contact with the motor-wheel, whereby the motor, which has been running free when the lever $E'$ was in median position, now imparts, by the intermediate mechanism and ropes, movement to the car. Upon moving the lever $E'$ to the next contact the current is required to traverse less of the variable resistance $e^2$, thereby increasing the speed of the motor and car. Upon moving the lever $E'$ to the last contact at the side of the segment all the resistance $e^2$ is cut out of the circuit, so that the motor runs at a still higher speed than before, moving the car correspondingly. When it is desired to stop the car, the lever is moved to the middle contact, whereby the brakes are permitted to operate and the wheel $F^2$, which was in contact with the motor-wheel, to recede out of contact therewith, so that the car is brought to a standstill while the motor continues running, the current passing through the resistance $x$, so as not to run the motor at too high a speed. Upon moving the switch-lever to the first contact at that side of the segment opposite to the side before mentioned the solenoid $D^2$ is energized, together with the other solenoid D from that before energized, whereby the other friction-wheel $F^2$ is thrown in contact with the motor-wheel and the car moved in a direction opposite to that in which it was previously moved, the speed of the car being controlled by moving the lever E' from one to the other of the various contacts, as before described.

When a safety-rope R' and sheave $G^2$ are to be used, the latter is supported above the upper drive or guide sheaves of the suspension-ropes, the safety-rope R' being connected with the upper ends of the car and counterweight, respectively, as shown in Figs. 8 and 9.

By examining the different applications of the motion-transmitting mechanisms shown in Figs. 1 to 9 it will be observed that whenever the friction-wheel of either one of the auxiliary shafts is placed in operative connection with the friction-wheel on the motor-shaft the auxiliary shaft and its drive-sheave are rotated always in opposite direction to the direction of motion of the motor-shaft, while the friction-wheel of the second shaft and its drive-gear are rotated in opposite direction to that of the friction-wheel in mesh with the motor-pulley. This result is obtained when one or the other auxiliary shaft is placed into operative connection with the motor, and is illustrated clearly in Figs. 10 and 11. The same result may also be obtained by supporting the auxiliary shafts in stationary journal-bearings and bringing the motor-shaft in operative connection with either one of the auxiliary shafts.

The advantages of my improved system of elevators are, first, that one driving-motor only is employed, which is continuously run in the same direction whatever be the direction of motion in which the car is run; secondly, that by the motion-transmitting mechanism which is employed the proper motion is imparted to the car or the same stopped without interrupting the continuous motion of the motor; thirdly, that the motor may be conveniently arranged at either upper or lower end of the elevator-shaft, according to the power employed, and, fourthly, that a reliably-controlled elevator system is provided which is especially adapted for the employment of electricity as the driving medium.

Having thus described my invention, I claim as new and desire to secure by Letters Patent—

1. The combination, with a car and its counterweight, of a suspension-rope for the same, drive-sheaves for said rope, a motor running continuously in one and the same direction, and motion-transmitting mechanisms between said motor and drive-sheaves, each of said mechanisms being adapted to be thrown into operative connection with the motor for moving the car in one or the opposite direction, substantially as set forth.

2. The combination, with a car and its counterweight, of a suspension-rope for the same, drive-sheaves for said suspension-rope, a motor running continuously in one and the same direction, motion-transmitting mechanisms between said motor and the drive-sheaves, and means for moving each of said motion-transmitting mechanisms into operative connection with the motor so as to impart motion to the car in one or the opposite direction, substantially as set forth.

3. The combination, with a car and its counterweight, of a suspension-rope for the same, drive-sheaves for said rope, a motor running continuously in one and the same direction, motion-transmitting mechanisms between the motor and the drive-sheaves, and means for moving each of said motion-transmitting mechanisms into operative connection with the motor and imparting to one drive-sheave motion in opposite direction to the motor-shaft and to the second drive-sheave motion in opposite direction to the first drive-sheave, substantially as set forth.

4. The combination, with a car and its counterweight, of a suspension-rope for the same, drive-sheaves for said rope, a motor running continuously in one and the same direction, auxiliary shafts for said drive-sheaves adjacent to and parallel with the motor-shaft, friction mechanisms between the motor-shaft and auxiliary shafts, and means for placing the friction mechanism of each of said auxiliary shafts in operative connection with the motor-shaft, substantially as set forth.

5. The combination, with a car and its counterweight, of a suspension-rope for the same, drive-sheaves for said rope, a motor running continuously in one and the same direction, auxiliary shafts adjacent to and parallel with the motor-shaft, a friction-wheel on the motor-shaft, a friction-wheel on each auxiliary shaft, and means for throwing the friction-wheel of each of the auxiliary shafts at will into operative connection with the wheel on the motor-shaft, substantially as set forth.

6. The combination, with a car and its counterweight, of a suspension-rope for the same, drive-sheaves for said rope at one end of the elevator-shaft, guide-sheaves for said rope at the opposite end of said shaft, a motor running continuously in one and the same direction, said motor being located between the drive-sheaves, auxiliary shafts adjacent to and parallel with the motor-shaft, and means for placing each of said auxiliary shafts in operative connection with the motor-shaft, substantially as set forth.

7. The combination, with a car and its counterweight, of a suspension-rope for the same, drive-sheaves for said rope, a motor running continuously in one and the same direction, auxiliary shafts for said drive-sheaves located adjacent to and parallel with the motor-shaft, motion-transmitting mechanisms between the motor-shaft and the auxiliary shafts, a brake mechanism for each auxiliary shaft, and mechanism operated simultaneously with the motion-transmitting mechanism of each of the auxiliary shafts for releasing said brake mechanism when starting the car and applying the same when the car is stopped, substantially as set forth.

8. The combination, with a car and its counterweight, of a suspension-rope for the same, drive-sheaves for said rope, a motor running continuously in one and the same direction, auxiliary shafts for said drive-sheaves adjacent to and parallel with said motor, motion-transmitting mechanisms between the motor-shaft and auxiliary shafts, means for placing each of the auxiliary shafts in operative connection with the motor-shaft, and a safety-cable connected with the car and counterweight and passing over an independent safety-sheave at the upper end of the elevator-shaft, substantially as set forth.

9. The combination, with a car and its counterweight, of a suspension-rope for the same, drive-sheaves for said rope, a motor running continuously in one and the same direction, auxiliary shafts for said drive-sheaves located adjacent to and parallel with the motor-shaft, movable bearings for one end of said auxiliary shafts, a friction mechanism between the motor-shaft and each auxiliary shaft, and means for shifting each of said bearings and auxiliary shafts so as to throw the friction mechanism of each of the auxiliary shafts into operative connection with the motor-shaft, substantially as set forth.

In testimony that I claim the foregoing as my invention I have signed my name in presence of two subscribing witnesses.

GEO. H. REYNOLDS.

Witnesses:
PAUL GOEPEL,
JOSEPH H. NILES.